(No Model.)
P. HOGAN.
PROCESS OF AND APPARATUS FOR MANUFACTURING FERTILIZERS.
No. 281,693. Patented July 24, 1883.
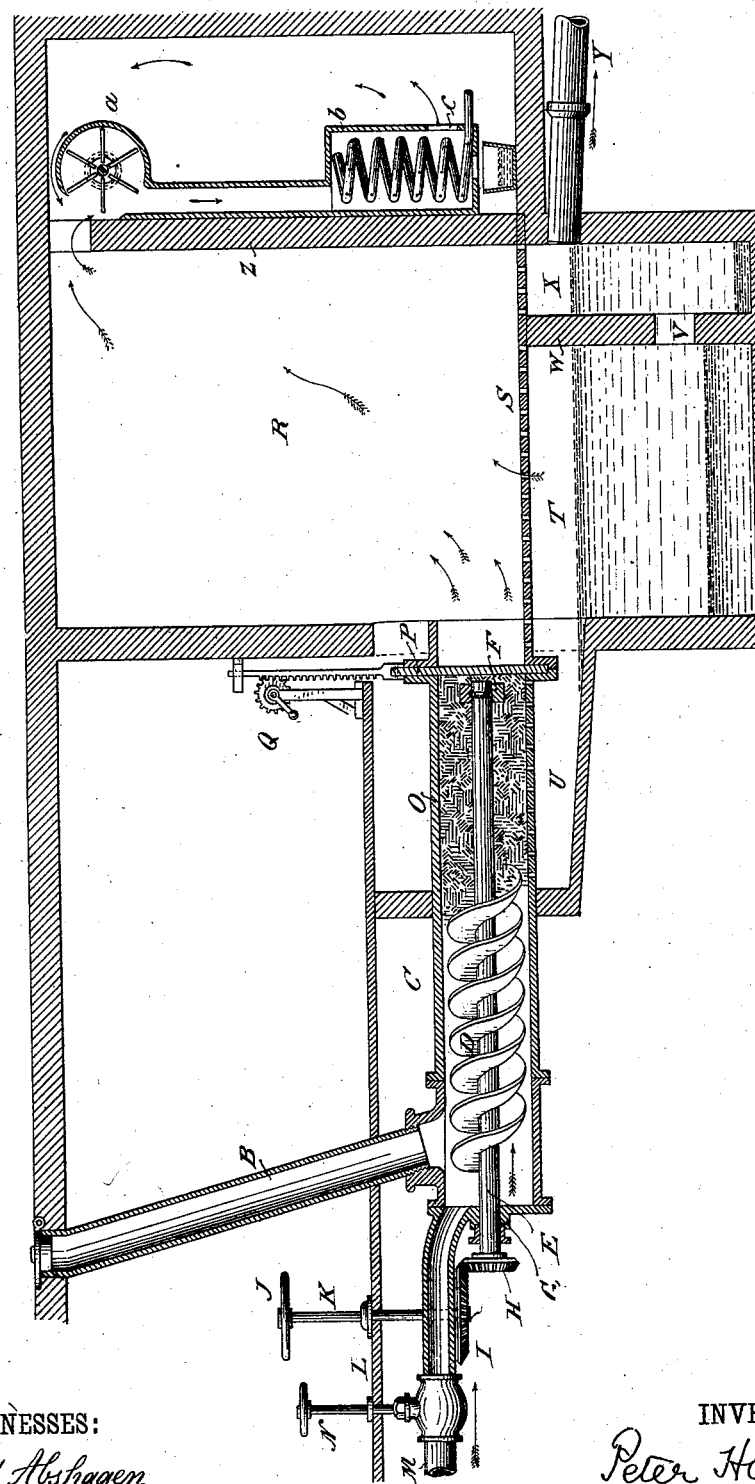
WITNESSES:
Ernest Abshagen
Geo. H. Benjamin
INVENTOR
Peter Hogan
BY Park Benjamin
His ATTORNEYS

UNITED STATES PATENT OFFICE.

PETER HOGAN, OF ALBANY, NEW YORK.

PROCESS OF AND APPARATUS FOR MANUFACTURING FERTILIZERS.

SPECIFICATION forming part of Letters Patent No. 281,693, dated July 24, 1883.

Application filed March 23, 1883. (No model.)

*To all whom it may concern:*

Be it known that I, PETER HOGAN, of the city of Albany, county of Albany, and State of New York, have invented a new and useful Improvement in Process of and Apparatus for Manufacturing Fertilizers from Sewage and Peat, &c., of which the following is a specification.

The invention consists in the process of and apparatus for manufacturing a fertilizer from sewage and other substances, the said sewage being forced through dried peat, spent tan-bark, or other porous and preferably organic material, by which the said sewage is filtered and cleaned, and the fertilizing material therein is intercepted and absorbed.

The object of the invention is to provide a new and economical mode of utilizing the valuable constituents of sewage, and of cleansing and deodorizing the residue, so that it shall not be a source of pollution to water-courses in which it may finally be discharged.

The accompanying drawing shows the compartments, pipes, and machinery in and by which the sewage is treated in accordance with my process as arranged in a suitable building.

A is an upper story or compartment, wherein the peat, spent tan-bark, or other dry porous material is stored. From said compartment the peat is conducted by a conveying-pipe, B, to a horizontal cylindrical vessel, C, in which is arranged a propeller, D, which may be a screw-shaped blade secured to the horizontal shaft E. Said shaft E has a bearing in a suitable support, F, at one end, and is journaled in the cylinder-head at G at the other. On the end of said shaft is a bevel-pinion, H, which gears with a like bevel-wheel, I, which may be turned, and the propeller D thus rotated by hand-wheel J on the vertical shaft K. The said shaft K extends, as shown, above the lower floor, L, of the building, so that a person standing on said floor may easily turn the wheel J; or, as is obvious, by suitable mechanism, steam or other power may be applied to said wheel.

M is the sewage-pipe, which conducts the sewage from the drains or sewers directly into the cylinder C. A suitable valve, N, is arranged in the said pipe to govern the flow as desired.

The propeller-blade D does not extend over the entire length of the shaft E, so that a portion of cylinder C is left free to receive the peat, which, after entering the cylinder C, as already explained, by the pipe B, is forced by the propeller to the farther end of the cylinder. Said portion O of the cylinder C has perforated sides, and its end is closed by a valve, P, which may be raised or lowered by means of the rack and pinion Q.

R is a chamber or compartment for drying the peat or other non-liquid material after it leaves the cylinder C. Said chamber has a perforated floor, S, through which the liquid remaining in the peat drains into the chamber T. The chamber T communicates with the perforated portion O of the cylinder C by the conduit U, and by the opening V in the partition W with the chamber X and escape-pipe Y. The escaping ammoniacal gas and stenches arising from the material in the chamber R are drawn through an opening in the partition Z by the exhaust-blower a, and are thus forced into the condenser b, wherein said gases, by means of cold water passing through a system of pipes in said apparatus, are condensed and mingled with the water, which escapes at the bottom of the condenser into a suitable receptacle, the purified air finding its exit from the side of the condenser, as shown by the arrow at c.

I do not limit myself to the particular arrangement of condenser described, nor to any especial form of condensing apparatus, the object being simply to remove the foul gases and vapors from the air, which may be done by water in many well-known devices.

The process is carried out by the above-described means or their substantial equivalents in the following manner: The sewage check-valve N being closed, the peat is shoveled down the conveyer-pipe B. It meets the propeller-blade D, which is set in motion by turning the wheel J, and is thereby forced into the perforated portion O of the cylinder C until said portion is filled. The valve P is meanwhile kept shut. The check-valve N is then opened, and the sewage allowed to flow through the peat and out of the perforations in the part O of the cylinder C to the settling-chamber T. Whatever solid matter may remain in the sewage after entering the chamber T is there deposited, the supernatant liquid passing off through the opening V to the chamber X and delivery-pipe Y. Meanwhile the ammoniacal gas and foul vapors from the chamber T rise up through the perforated floor S, and are drawn into the condenser b by the blower a and purified, as already described. As soon as the peat contained in the part O of the cylinder C becomes thoroughly impregnated with the solid matter of the sewage, and so clogged as to materially reduce or prevent further flow of sewage through it, the sewage check-valve N is closed and the valve P is opened, and a fresh supply of peat is admitted through the pipe B, as before. The clogged peat is thus forced out upon the floor of the drying-chamber, and when this is done the valve P is shut and the operation goes on, as already described. The liquid contained in the peat forced out falls through the floor S into the chamber T, and the gases and vapors arising therefrom are drawn into the condenser b and purified, as already described.

It will be seen that in this process a new supply of peat constantly replaces that already impregnated.

After drying, the impregnated peat may be mixed while in the chamber with pulverized limestone or clay, or both, or other suitable materials, to adapt it for convenient use as a fertilizer.

I claim as my invention—

1. The process of manufacturing fertilizers and filtering sewage herein set forth, consisting in admitting a supply of dried peat, spent tan-bark, or similar porous substance into a suitable receptacle, causing sewage to flow through said material until the latter is impregnated with the solid substances in said sewage, then shutting off the supply of sewage, then forcing by suitable mechanism a fresh supply of peat or like material into the same receptacle, whereby the contents thereof are driven out, then readmitting sewage until said second supply of peat or like material is impregnated, substantially as described.

2. In an apparatus for manufacturing fertilizing material from dried peat or other porous substance and sewage, or for filtering sewage, a vessel communicating at one end with pipes or conduits suitable for the admission, respectively, of liquid and semi-liquid sewage and dried porous material, having at or near the end opposite to that at which the material enters a perforated wall or walls, in combination with or containing mechanism whereby the solid material entering said vessel may be forced and packed into the perforated portion thereof, substantially as described.

3. In an apparatus for manufacturing fertilizing material from a dry porous substance and sewage, or for filtering sewage, a vessel or chamber composed, substantially, of two portions, one portion having a solid wall and the other a perforated wall or walls, conduits for admitting dry organic porous material and liquid or semi-liquid sewage into that part of the vessel having a solid wall or walls, a means of forcing said porous substance into the perforated portion of said vessel, and a valve or other means for allowing or controlling the escape of solid material contained in said perforated portion, substantially as described.

4. In an apparatus for manufacturing fertilizing material from a dry porous substance and sewage, and for filtering sewage, a vessel or chamber composed, substantially, of two portions, one having solid walls and the other a perforated wall or walls, a conduit for admitting said dry substance and a conduit for admitting liquid or semi-liquid sewage into said first-mentioned portion, a means of forcing said porous substance into the perforated part of the vessel, a conduit for receiving the liquid escaping through the perforated walls, a settling-vessel for receiving said liquid, and wherein its solid matter is deposited, and a delivery-pipe from said settling-vessel, substantially as described.

5. In an apparatus for manufacturing fertilizing material from a dry porous substance and sewage, and for filtering sewage, a vessel or chamber composed, substantially, of two portions, one having solid walls and the other having a perforated wall or walls, a conduit for admitting said dry substance and a conduit for admitting liquid or semi-liquid sewage into said first-mentioned portion, a means of forcing said porous substance into the perforated part of the vessel, a valve or other means of allowing or controlling the escape of non-liquid material from the said vessel, and a chamber having a perforate floor whereon said non-liquid material is received and drained, substantially as described.

6. The combination of the cylinder C, having a perforated portion, O, the shaft E, propeller D, a means of rotating said propeller, sewage-pipe M, containing a check-valve, N, and a means of opening and closing said valve, substantially as described.

7. The combination of the cylinder C, having a perforated portion, O, the shaft E, propeller D, a means of rotating said propeller, pipes M, check-valve N, pipe B, valve P and means of operating the same, conduit U, settling-vessel T, and delivery-pipe Y, substantially as described.

8. The combination of the cylinder C, having a perforated portion, O, the shaft E, propeller D, a means of rotating said propeller, pipe M, check-valve N, pipe B, valve P and means of operating the same, chamber R, perforated floor S, and tank T, substantially as described.

9. The combination of the chamber R, perforated floor S, tank T, exhaust-blower $a$, and condenser $b$, substantially as described.

10. The combination of the cylinder C, having a perforated portion, O, the shaft E, propeller D, a means of rotating said propeller, pipe M, check-valve N, pipe B, valve P and means of operating the same, chamber R, perforated floor S, tank T, conduit O, delivery-pipe Y, exhaust-blower $a$, and condenser $b$, substantially as described.

PETER HOGAN.

Witnesses:
 JOS. R. GEOGHAN,
 JOHN HART.